United States Patent
Kaleem et al.

(10) Patent No.: US 10,125,288 B2
(45) Date of Patent: Nov. 13, 2018

(54) COATING COMPOSITIONS COMPRISING 2,2'-BIPHENOL

(75) Inventors: Kareem Kaleem, Loveland, OH (US); Youssef Moussa, Loveland, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1232 days.

(21) Appl. No.: 14/114,580

(22) PCT Filed: May 1, 2012

(86) PCT No.: PCT/US2012/035946
§ 371 (c)(1), (2), (4) Date: Feb. 4, 2014

(87) PCT Pub. No.: WO2012/151184
PCT Pub. Date: Nov. 8, 2012

(65) Prior Publication Data
US 2014/0322465 A1    Oct. 30, 2014

Related U.S. Application Data

(60) Provisional application No. 61/481,278, filed on May 2, 2011, provisional application No. 61/481,281, filed on May 2, 2011.

(51) Int. Cl.
| | | |
|---|---|---|
| C09D 163/00 | (2006.01) | |
| C09D 5/44 | (2006.01) | |
| C08G 59/06 | (2006.01) | |
| C08G 59/14 | (2006.01) | |
| C08G 59/24 | (2006.01) | |

(52) U.S. Cl.
CPC ......... *C09D 163/00* (2013.01); *C08G 59/066* (2013.01); *C08G 59/1422* (2013.01); *C08G 59/1488* (2013.01); *C08G 59/245* (2013.01); *C09D 5/4434* (2013.01); *Y10T 428/1355* (2015.01); *Y10T 428/31511* (2015.04)

(58) Field of Classification Search
CPC ............... C09D 163/00; C09D 5/4434; C08G 59/1488; C08G 59/1422; C08G 59/245; C08G 59/066; Y10T 428/31511; Y10T 428/1355

See application file for complete search history.

(56) References Cited

U.S. PATENT DOCUMENTS

| | | | |
|---|---|---|---|
| 4,164,487 A | * | 8/1979 | Martin ............... C08G 59/4071 427/195 |
| 4,619,952 A | | 10/1986 | Hart et al. |
| 4,638,020 A | | 1/1987 | Christenson et al. |
| 4,826,895 A | * | 5/1989 | Kanai ................ C08G 59/066 523/443 |
| 4,943,359 A | | 7/1990 | Patzschke et al. |
| 6,090,870 A | | 7/2000 | Chang et al. |
| 6,136,927 A | | 10/2000 | Swarup et al. |
| 6,376,081 B1 | | 4/2002 | Parekh et al. |
| 6,924,328 B2 | | 8/2005 | Legleiter et al. |
| 7,592,047 B2 | | 9/2009 | O'Brien et al. |
| 7,592,067 B2 | | 9/2009 | Christiansen et al. |

FOREIGN PATENT DOCUMENTS

| | | |
|---|---|---|
| JP | 59 109514 A | 6/1984 |
| JP | 59 170084 A | 9/1984 |
| JP | 2001 114862 A | 4/2001 |

OTHER PUBLICATIONS

Machine Translation of JP2001114862; Akatsuka et al.; 2001.*
Pham et al., "Epoxy Resins", Encyclopedia of Polymer Science and Technology, vol. 9, John Wiley & Sons, Inc., Jan. 1, 2004, pp. 1-127.
S. Fetouaki et al., "Synthese d'une nouvelle resine epoxyde a base du 2,2'-dihydroxydiphenyle", EU. Poly. Jour., Pergamon Press, Oxford, GB, vol. 38 No. 4, Apr. 1, 2002, 787-793.

\* cited by examiner

*Primary Examiner* — James C Yager
(74) *Attorney, Agent, or Firm* — William J. Uhl

(57) ABSTRACT

A coating composition comprising a polyglycidyl ether of a 2,2'-biphenol that is substantially free of bisphenol A, bisphenol F and their derivatives and residues is disclosed. Food packages coated at least in part with such coatings are also disclosed.

8 Claims, No Drawings

COATING COMPOSITIONS COMPRISING 2,2'-BIPHENOL

FIELD OF THE INVENTION

The present invention relates to coating compositions comprising 2,2'-biphenol.

BACKGROUND OF THE INVENTION

A wide variety of coatings have been used to coat the surfaces of food and beverage containers. For example, metal cans are sometimes coated using coil coating or sheet coating operations; that is, a plane or coil or sheet of a suitable substrate, for example, steel or aluminum, is roll coated or electrodeposited with a suitable composition and cured. The coated substrate is then formed into the can body or can end. Alternatively, the coating composition may be applied, for example, by spraying, dipping and electrodeposition, to the formed can and then cured. Coatings for food and beverage containers are typically capable of high speed application to the substrate and provide the necessary properties when cured to perform in a demanding end use. For example, the coating should be safe for food contact and have acceptable adhesion to the substrate.

Many of the coating compositions for food and beverage containers are based on epoxy resins that are the polyglycidyl ethers of bisphenol A. Use of bisphenol A and derivatives thereof, such as diglycidyl ethers of bisphenol A (BADGE), epoxy novolak resins and polyols prepared with bisphenol A and bisphenol F have recently come under attack. Although the balance of scientific evidence available to date indicates that small trace amounts of BPA or BADGE that might be released from existing coatings does not pose health risks to humans, these compounds are nevertheless perceived by some as being harmful to human health. Consequently, there is a strong desire to eliminate these compounds from coatings for food and beverage containers. Accordingly, packaging coating compositions for food and/or beverage packaging that do not contain extractable quantities of BPA and/or derivatives thereof while providing suitable properties are therefore desired.

SUMMARY OF THE INVENTION

The present invention is directed to a coating composition comprising a polyglycidyl ether of a 2,2'-biphenol, and wherein said coating is substantially free of bisphenol A, and/or derivatives and/or residues thereof, and bisphenol F, and/or derivatives and/or residues thereof.

The present invention is further directed to a coating composition comprising a phosphated polyglycidyl ether of a 2,2'-biphenol.

The present invention is further directed to food and/or beverage packaging coated at least in part with one or more of such coatings.

DETAILED DESCRIPTION

The present invention is directed to a coating composition comprising a polyglycidyl ether of a 2,2'-biphenol. Suitable polyglycidyl ethers of a 2,2'-biphenol contain two or more epoxy or oxirane groups. Typical polyglycidyl ethers are epoxide-terminated linear epoxy resins having a 1,2-epoxy equivalency not substantially in excess of 2, usually about 1.5 to 2; in certain embodiments, the epoxy resins are difunctional with regard to epoxy. The polyglycidyl ether of 2,2'-biphenol typically has a number average molecular weight ($M_n$) of at least 400, such as 400 to 2400 g/mole.

Examples of a 2,2'-biphenol include 2,2'-biphenol itself and substituted 2,2'-biphenol including those of the structure:

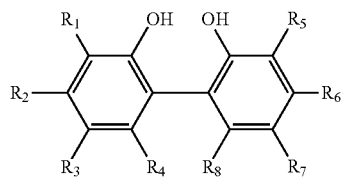

in which $R_1$, $R_2$, $R_3$, $R_4$, $R_5$, $R_6$, $R_7$ and $R_8$ are the same or different and are independently hydrogen and hydrocarbyl groups. "Hydrocarbyl" and like terms include, for example, alkyl groups, heteroalkyl groups, aryl groups, heteroaryl groups and such groups with any substitutions ("substituted hydrocarbyl groups"). As used herein, the term "2,2'-biphenol" refers to 2,2'-biphenol itself and substituted 2,2'-biphenol in which at least one of $R_1$ through $R_8$ are anything other than hydrogen.

Examples of suitable polyglycidyl ethers of a 2,2'-biphenol ("PGE") can be formed by reacting epihalohydrins with a 2,2'-biphenol in the presence of an alkali condensation and dehydrohalogenation catalyst such as sodium hydroxide or potassium hydroxide. Useful epihalohydrins include epibromohydrin, dichlorohydrin and especially epichlorohydrin.

In certain embodiments, the polyglycidyl ether of a 2,2'-biphenol is prepared as described above, followed by chain extension or advancement to a higher molecular weight product that may or may not have epoxy termination. Examples of chain extenders include monoalcohols and polyols, including polymeric polyols, and polycarboxylic acids/anhydrides. Certain embodiments, however, specifically exclude reaction of the PGE with a carboxylic acid and/or anhydride-containing compound. Specific examples of chain extenders include 2,2'-biphenol and/or polyfunctional materials that are reactive with epoxy functionality such as dihydric phenols, for example, resorcinol, pyrocatechol and hydroquinone; aliphatic polyhydric alcohols, for example, ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. Examples of other chain extenders include amines such as ammonia and primary amines such as ethylamine and butylamine, diamines such as hydrazine and ethylene diamine and hydroxyalkylamines such as monoethanolamine and diethanolamine. In certain embodiments, the chain extender is a polymeric polyol and the monomers of the polymeric polyol, such as (meth)acrylic polymers, can contain a monomer with a group that is reactive with the groups of the PGE. Such reactive groups include, for example, epoxy groups such as those associated with glycidyl methacrylate that are reactive with the hydroxyl groups associated with the PGE or an isocyanate acrylate such as isocyanato ethyl methacrylate that is also reactive with the hydroxy groups of the PGE. In certain embodiments, the monomers of the polymeric polyol can be polymerized in the presence of the PGE. In other embodiments, the polymeric polyol, when reacted with the PGE, will form an ungelled resinous reaction product. As used herein, the term "ungelled" refers to resins that are substantially free of crosslinking and have an intrinsic viscosity when dissolved in a suitable solvent. Gelled resins have too high an intrinsic viscosity to be measured. Examples of suitable polycarboxylic acids for use as chain extenders are phthalic acid, isophthalic acid, terephthalic acid, 1,4-cyclohexane dicarboxylic acid, succinic acid, sebacic acid, methyltetrahydrophthalic acid, methylhexahydrophthalic acid, tetrahydrophthalic acid, dodecane dioic acid, adipic acid, azelaic acid, naphthylene dicarboxylic acid, pyromellitic acid, dimer fatty acids and/or trimellitic acid. Anhydrides of polycarboxylic acids where they exist can also be used.

In certain embodiments, the PGE is phosphated. More specifically, the PGE is reacted with a phosphorus acid. The PGE can be reacted with the phosphorous acid before and/or after chain extension, if such extension is done. A "phosphated polyglycidyl ether of a 2,2'-biphenol" therefore refers to any PGE described herein that has been further reacted with a phosphorous acid. The phosphorus acid that is reacted with the PGE can be a phosphinic acid, a phosphonic acid and/or a phosphoric acid. The phosphoric acid can be in the form of an aqueous solution, for example, an 85 percent by weight aqueous solution, or can be 100 percent phosphoric acid or super phosphoric acid. Typically, the acid is provided in amounts of at least 0.2, more typically 0.2 to 1.0 or 0.2 to 0.5 equivalents of phosphoric acid per equivalent of epoxy of the polyepoxide. The reaction of the phosphorus acid with the PGE is typically conducted in organic solvent. The organic solvent can be a hydroxyl functional compound, such as a monofunctional compound. Among the hydroxyl functional compounds that may be used are aliphatic alcohols, cycloaliphatic alcohols and alkyl ether alcohols. Examples of hydroxyl functional compounds include n-butanol and 2-butoxyethanol. Other suitable solvents are ketones and esters. Examples include methyl ethyl ketone, methyl isobutyl ketone, butyl glycol acetate and methoxypropyl acetate. Mixtures of organic solvents can also be used. The organic solvent or mixture thereof typically has a boiling point of 65 to 250° C. The reactants and the organic solvent are typically mixed at a temperature of 50° C. to 95° C. and once the reactants are contacted, the reaction mixture can be maintained at a temperature of 90° C. to 200° C. The reaction typically is allowed to proceed for a period of about 45 minutes to 6 hours. The organic solvent for the reaction is typically present in amounts of about 20 to 50 percent by weight based on total weight of phosphorus acid, PGE and organic solvent.

The PGE is typically present in the coating compositions in an amount of 0.1 to 95, such as 0.1 to 85 or 0.1 to 70 weight percent. In certain embodiments, the present coatings will further comprise a crosslinker or curing agent. Curing agents, if used in the composition, are reactive with hydroxyl groups associated with the PGE.

Among the curing agents that may be used are phenols, phenolplasts or phenol-formaldehyde resins, aminoplast or triazine-formaldehyde resins, and polyisocyanates. The phenol-formaldehyde resins can be of the resol type. Examples of suitable phenols are phenol itself, butyl phenol, xylenol and cresol. Cresol-formaldehyde resins, the types typically etherified with butanol, are often used. For the chemistry in preparation of phenolic resins, reference is made to "The Chemistry and Application of Phenolic Resins or Phenolplasts", Vol. V, Part I, edited by Dr. Oldring; John Wiley & Sons/Cita Technology Limited, London, 1997. Examples of commercially available phenolic resins are PHENODUR® PR285 and BR612 and those resins sold under the trademark BAKELITE®, such as BAKELITE 6581LB.

Examples of aminoplast resins are those that are formed by reacting a triazine such as melamine or benzoguanamine with formaldehyde. These condensates are typically etherified with methanol, ethanol, and/or butanol. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL such as MAPRENAL MF980 and under the trademark CYMEL such as CYMEL 303 and CYMEL 1128, available from Cytec Industries.

Examples of polyisocyanate curing agents are blocked polyisocyanates. A number of blocked polyisocyanates are satisfactory curing agents. These agents are well known in the art. Generally, the organic polyisocyanates are blocked with a volatile alcohol, epsilon caprolactam or ketoxime. These blocked polyisocyanates become unblocked at elevated temperatures, e.g., above about 100° C. "The Chemistry of Organic Film Formers", Robert E. Kreiger Pub. Co., copyrighted 1977, by D. H. Solomon, pages 216 to 217, contains a description of many blocked isocyanates that can be used here.

The curing agent can be used in amounts of 0 to 90, such as 10 to 50 or 15 to 40 weight percent, with weight percent based on the total weight of the PGE and curing agent.

In certain embodiments, the coating composition contains a diluent to dissolve or disperse the ingredients in the composition. The diluent can be entirely an organic solvent (organic solvent based coating composition) or mixture of water and compatible organic solvents such as alcohols, ketones and glycol ethers (aqueous based coating composition).

The organic solvent can be selected to have sufficient volatility to evaporate from the coating composition during the curing process, such as during heating from 175-205° C. for about 5 to 15 minutes. Examples of suitable organic solvents are aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methylisobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. The diluent can be used in the coating compositions in amounts of up to 80, such as 20 to 80, such as 30 to 70 percent by weight based on total weight of the coating composition.

It will be appreciated that in certain embodiments the PGE and curing agent therefor, if used, can form all or part of the film-forming resin of the coating. In certain embodiments, one or more additional film-forming resins are also used in the coating. The additional film-forming resin can comprise, for example, acrylic polymers, polyester polymers, polyurethane polymers, polyamide polymers, polyether polymers, polysiloxane polymers, copolymers thereof, and mixtures thereof. Generally, these polymers can be any polymers of these types made by any method known to those skilled in the art. The additional film-forming resin may be thermosetting or thermoplastic. In embodiments where the additional film-forming resin is thermosetting, the coating composition may further comprise a curing agent that may be selected from any of the curing agents described above, or any other suitable curing agent(s). The curing agent may be the same or different from the curing agent that is used to crosslink the PGE. In certain other embodiments, a thermosetting film-forming polymer or resin having functional groups that are reactive with themselves are used; in this manner, such thermosetting coatings are self-crosslinking. The coating compositions may be solvent-based liquid compositions. The coating compositions can be one component ("1K"), that is, all the ingredients can be stored in one container, or multi-component, that is, the ingredients are stored in two or more containers and mixed just prior to use.

The coating compositions of the present invention can also comprise any additives standard in the art of coating manufacture including lubricants such as waxes and surfactants, catalysts, organic cosolvents, colorants, plasticizers, abrasion-resistant particles, film strengthening particles, flow control agents, thixotropic agents, rheology modifiers, antioxidants, biocides, dispersing aids, adhesion promoters, clays, stabilizing agents, fillers, reactive diluents, and other customary auxiliaries, or combinations thereof. The colorants and abrasion-resistant particles can be, for example, those disclosed in United States Publication Number 2010/0055467A1, paragraphs 24-34, hereby incorporated by reference.

In one embodiment, an ungelled resinous reaction product of PGE and a polymer polyol can be prepared by heating the PGE in organic solvent to reflux temperature. Thereafter, a (meth)acrylic monomer component is added with a free radical initiator such as a peroxide or azo compound. Reaction is continued at elevated temperature to form an ungelled resinous reaction product. Typically, the weight ratio of PGE to methacrylic monomer component in these embodiments is from 5 to 95:95 to 5, such as 20 to 80:80 to 20.

The present coatings can be applied to any substrates known in the art, for example, automotive substrates, industrial substrates, packaging substrates, architectural substrates, wood flooring and furniture, apparel, electronics including housings and circuit boards, glass and transparencies, sports equipment including golf balls, and the like. These substrates can be, for example, metallic or nonmetallic. Metallic substrates include tin, steel, tin-plated steel, tin free steel, black plate, chromium passivated steel, galvanized steel, aluminum, aluminum foil. Nonmetallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and other nonmetallic substrates. The substrate can be one that has been already treated in some manner, such as to impart visual and/or color effect. Accordingly, the coatings of the present invention can be a clear coat, a pigmented coat, can be used alone or in conjunction with other coatings such as a primer layer, basecoat, topcoat and the like.

The coatings of the present invention are particularly suitable for use as a packaging coating. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to cracking, popping, corrosion, blushing and/or blistering.

Accordingly, the present invention is further directed to a package coated at least in part with any of the coating compositions described above. A "package" is anything used to contain another item. It can be made of metal or nonmetal, for example, plastic or laminate, and be in any form. In certain embodiments, the package is a laminate tube. In certain embodiments, the package is a metal can. The term "metal can" includes any type of metal can, container or any type of receptacle or portion thereof used to hold something. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends", which are typically stamped from can end stock and used in conjunction with the packaging of beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two-piece cans" and "three-piece cans" as well as drawn and ironed one-piece cans; such one-piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. In some embodiments, the coating is applied to a coil or sheet by roll coating; the coating is then cured by heating or radiation and can ends are stamped out and fabricated into the finished product, i.e. can ends. In other embodiments, the coating is applied as a rim coat to the bottom of the can; such application can be by roll coating. The rim coat functions to reduce friction for improved handling during the continued fabrication and/or processing of the can. In certain embodiments, the coating is applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

The packages of the present invention can be coated with any of the compositions described above by any means known in the art, such as spraying, roll coating, dipping, flow coating and the like; the coating may also be applied by electrocoating when the substrate is conductive. Electrocoating is particularly suitable with coatings comprising a phosphated polyglycidyl ether of a 2,2'-biphenol. The appropriate means of application can be determined by one skilled in the art based upon the type of package being coated and the type of function for which the coating is being used. The coatings described above can be applied over the substrate as a single layer or as multiple layers with multiple heating stages between the application of each layer, if desired. After application to the substrate, the coating composition may be cured by any appropriate means.

The present coatings can also be used as a packaging "size" coating, wash coat, spray coat, end coat, and the like.

The coatings can be applied in certain embodiments to a dry film thickness of 0.10 mils to 1.0 mils, such as from 0.10 to 0.50 mils, or from 0.15 to 0.30 mils. Thicker or thinner dry film thicknesses are also within the scope of the present invention.

Certain embodiments of the present coatings are free of acrylic and/or free of latex. As used in this context, "free" means acrylic and/or latex are not intentionally added, and, if present, are present in an amount of less than 5 weight percent, such as less than 2 weight percent or less than 1 weight percent, or 0 weight percent, with weight percent based on total weight of the coating.

In certain embodiments, the compositions of the invention may be substantially free, may be essentially free and/or may be completely free of bisphenol A and derivatives and/or residues thereof, including bisphenol A diglycidyl ether ("BADGE"). Such compositions are sometimes referred to as "BPA non intent" because BPA, including derivatives or residues thereof, are not intentionally added but may be present in trace amounts because of unavoidable contamination from the environment. The compositions may also be substantially free, may be essentially free and/or may be completely free of bisphenol F and derivatives and/or residues thereof, including bisphenol F diglycidyl ether ("BFDGE"). The term "substantially free" as used in this context means the compositions contain less than 1000 parts per million (ppm) of the recited compound including derivatives or residues thereof; the term "essentially completely free" means the compositions contain less than 100 ppm; the term "completely free" means that the compositions contain less than 20 parts per billion (ppb) of the recited compound including derivatives or residues thereof.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the invention has been described in terms of "a" polyglycidyl ether of "a" 2,2'-biphenol, "a" phosphorus acid monomer, "an" organic solvent, "a" chain extender and the like, mixtures of these and other components can be used. Also, as used herein, the term "polymer" is meant to refer to prepolymers, oligomers and both homopolymers and copolymers; the prefix "poly" refers to two or more. When ranges are given, any endpoints of those ranges and/or numbers within those ranges can be combined with the scope of the present invention. "Including", "such as", "for example" and like terms means "including/such as/for example but not limited to". As used herein, the molecular weights are determined by gel permeation chromatography using a polystyrene standard. Unless otherwise indicated, molecular weights are on a number average basis ($M_n$). The terms "acrylic" and "acrylate" are used interchangeably (unless to do so would alter the intended meaning) and include acrylic acids, anhydrides, and derivatives thereof, lower alkyl-substituted acrylic acids, e.g., $C_1$-$C_2$ substituted acrylic acids, such as methacrylic acid, ethacrylic acid, etc., and their $C_1$-$C_6$ alkyl esters and hydroxyalkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

The invention claimed is:

1. A food or beverage container containing a coating contacting the food or beverage in which the coating is the cured reaction product of a chain-extended polyglycidyl ether of 2,2'-biphenol, wherein the coating is substantially free of bisphenol A and/or derivatives and/or residues thereof and bisphenol F and/or derivatives and/or residues thereof.

2. The food or beverage container of claim 1 in which the polyglycidyl ether of 2,2'-biphenol is further chain extended with a polyol.

3. The food or beverage container of claim 2 in which the polyol is a dihydric phenol.

4. The food or beverage container of claim 3 in which the dihydric phenol is 2,2'-biphenol.

5. The food or beverage container of claim 1 in which the 2,2'-biphenol is of the structure:

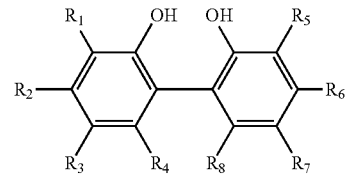

in which $R_1$, $R_2$, $R_3$, $R_4$, $R_5$, $R_6$, $R_7$ and $R_8$ may be the same or different and are independently hydrogen and hydrocarbyl.

6. The food or beverage container of claim 1 in which the polyglycidyl ether of 2,2'-biphenol is phosphated.

7. The food or beverage container of claim 1, which is a metal can.

8. The food or beverage container of claim 6, which is a metal can.

* * * * *